(12) United States Patent
McGaughy

(10) Patent No.: US 7,073,802 B2
(45) Date of Patent: Jul. 11, 2006

(54) STEERING KNUCKLE

(75) Inventor: Mike McGaughy, Fresno, CA (US)

(73) Assignee: Mike McGaughy's Classic Chevy Parts, Inc., Fresno, CA (US)

( * ) Notice: Subject to any disclaimer, the term of this patent is extended or adjusted under 35 U.S.C. 154(b) by 0 days.

(21) Appl. No.: 11/129,039

(22) Filed: May 12, 2005

(65) Prior Publication Data

US 2005/0258608 A1    Nov. 24, 2005

Related U.S. Application Data

(63) Continuation of application No. 11/009,597, filed on Dec. 10, 2004, now Pat. No. 6,962,357, which is a continuation of application No. 10/313,637, filed on Dec. 5, 2002, now Pat. No. 6,860,498.

(51) Int. Cl.
    *B62D 7/18* (2006.01)
(52) U.S. Cl. ............................. 280/93.51; 280/93.512
(58) Field of Classification Search ............ 280/93.51, 280/935.11, 93.512
    See application file for complete search history.

(56) References Cited

U.S. PATENT DOCUMENTS

| 2,227,521 A | 1/1941 | Utz |
| 3,749,415 A | 7/1973 | Sampatacos |
| 3,865,394 A | 2/1975 | Epner et al. |
| 4,618,159 A | 10/1986 | Kozyra et al. |
| 4,722,540 A | 2/1988 | Kozyra et al. |
| 4,953,894 A | 9/1990 | Broszat et al. |
| 5,022,673 A | 6/1991 | Sekino et al. |
| 5,951,030 A | 9/1999 | Butler |
| 6,179,308 B1 | 1/2001 | Mielauskas et al. |
| 6,398,240 B1 | 6/2002 | Taylor |
| 6,431,569 B1 | 8/2002 | Handa |
| 6,616,156 B1 | 9/2003 | Dudding et al. |
| 6,729,633 B1 | 5/2004 | Irwin |
| 2005/0104312 A1* | 5/2005 | Durand .................. 280/93.512 |

OTHER PUBLICATIONS

Advertisement from *Sport Truck* magazine (1999) 2822 E. California Avenue, Fresno, CA, 93721, Telephone No. 209-445-1602, 3 pages total.

Belltech Car Wash Brochure (Dec. 1988) Bell Tech, Inc. (Bell Super Tech, Inc.), 152 M Street, Fresno, CA, 93721, Telephone No. 209-445-1602, 4 pages total.

Belltech Application Guide (2001) 2822 E. California Avenue, Fresno, CA, 93721, Telephone No. 559-445-1602, www.belltechcorp.com, 20 pages total.

(Continued)

*Primary Examiner*—Paul N. Dickson
*Assistant Examiner*—Laura B. Rosenberg
(74) *Attorney, Agent, or Firm*—Towsend and Townsend and Crew LLP

(57) ABSTRACT

The present invention is particularly useful for lowering the front end of an automobile. The devices, methods, and systems of the present invention can find use in any variety of automobiles, such as trucks, sport utility vehicles (SUVs), passenger cars, and the like. The invention can be employed regardless of the type of suspension system in the automobile, and allows the vehicle to be lowered while retaining a maximum amount of travel. This is accomplished with a drop spindle having certain features such as a tap opening and a countersunk opening on the underside of the lower ball joint boss.

1 Claim, 14 Drawing Sheets

OTHER PUBLICATIONS

Belltech Application Guide (2003) 2822 E. California Avenue, Fresno, CA, 93721, Telephone No. 559-445-1602, www.belltechcorp.com, 20 pages total.

Belltech Catalog (1989) Bell Tech, Inc., 2885 So. Chestnut, Fresno, CA, 93725, Telephone No. 209-445-1602, 4 pages total.

Belltech Products Catalog (1996) 2822 E. California Avenue, Fresno, CA, 93721, Telephone No. 209-445-1602, 36 pages total.

Belltech Suspension Products; advertisement dated Sep. 16, 2001 (1 page).

Cook, Jeremy. "A Low Blaze: Gaylord's and Belltech Put the Smack-Down on an '02 Blazer" (Sep. 2002) *Truckin'* Magazine, pp. 274-282.

Flyer from Oct.-Nov. 2001 SEMA trade show illustrating Belltech Model 2102 Lowering Spindle Assembly (1 page).

Installation Instructions for Belltech Model 2102 Lowering Spindle Assembly dated Dec. 2001 (10 pages).

Picture and ordering information for Belltech 2102 spindle [online] (1 page). <URL: http://store.summitracing.com/default.asp?target=partdetail.asp&part=BEL%2D2102&N=400013&Nao=10&auto-view=sku>.

* cited by examiner

STEERING KNUCKLE

CROSS-REFERENCES TO RELATED APPLICATIONS

This is a U.S. continuation patent application which claims priority from U.S. patent application Ser. No. 11/009,597 filed on Dec. 10, 2004, now U.S. Pat. No. 6,962,357, which is a continuation of U.S. patent application Ser. No. 10/313,637 filed on Dec. 5, 2002, now U.S. Pat. No. 6,860,498, the full disclosures of which are herein incorporated by reference.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

This invention generally relates to steering knuckles for automobile suspension and steering systems, and in particular provides devices and methods that lower the chassis of an automobile.

A suspension system is an assembly of components designed to support a vehicle, and is typically configured so the weight of the vehicle is borne on the wheels and axles. The suspension system is designed to absorb or dissipate the effects of uneven road surfaces, and to keep the wheels properly aligned during straight-ahead driving as well as through turns.

In a rear wheel drive vehicle (RWD), the rear suspension system transfers power to propel the vehicle. The rear axle, or drive axle, is also called a live axle because it transmits power from the engine to the wheels. The front suspension system is intended to provide for directional control of the vehicle. The front axle, or steering axle, is referred to as a dead axle because it does not transmit power; the wheels passively rotate about the ends of the axle. In a front wheel drive vehicle (FWD) the front axle is a live axle, and the rear axle is a dead axle. In a four wheel drive vehicle (4WD) both the front and rear axles are live axles.

Many types of suspension systems include a steering knuckle. The steering knuckle helps to steer, brake, and support the automobile. When the driver turns the steering wheel, the tie rod transmits turning force to the knuckle, which turns the wheel in the desired direction. The knuckle also supports the brakes that transmit braking forces to the wheel. The weight of the vehicle is transmitted from the chassis, through the control arms, through the knuckle, and to the wheels.

In a conventional dead axle set-up, the steering knuckle includes a shaft-like projection, known as a spindle pin or spud, about which the wheel rotates. In contrast, a live axle steering knuckle does not have a spindle pin, but instead has a central aperture that accommodates the drive axle. The drive axle passes through the central aperture of the knuckle, and transmits power to the wheels. Thus, the wheel is actively rotated by the drive axle instead of passively rotating about the spindle pin.

There are known steering knuckle designs for lowering the chassis of an automobile. These designs are also called drop spindles, dropped spindles, or lowered spindles. In brief, the knuckle is modified such that the vehicle chassis frame is repositioned closer to the ground. It is relatively straightforward to modify a conventional dead axle steering knuckle to create a drop spindle. In contrast, there are significant difficulties in creating a live axle steering knuckle that operates as a drop spindle.

To accommodate for the knuckle aperture, others have proposed drop spindles that require inversion of the ball joints and A-frames. Such approaches can introduce strained geometries into the suspension, and result in suspensions having reduced travel. Further, they are cumbersome and inefficient, and can only be used on certain types of suspensions, such as coiled spring suspensions. More effective devices and methods are needed for lowering the chassis frame of an automobile, regardless of the type of suspension system used, while retaining a maximum amount of travel. The present invention satisfies such needs.

BRIEF SUMMARY OF THE INVENTION

In a first aspect, the present invention provides a steering knuckle for lowering the chassis frame of an automobile, where the steering knuckle includes an upper ball joint boss, a lower ball joint boss, a central aperture that receives a live wheel hub assembly, and a tap opening. The steering knuckle can have a central longitudinal axis defined by the tap opening, where the axis intersects the upper ball joint boss. An underside of the steering knuckle lower ball joint boss can include a countersunk opening. A distance between a central longitudinal axis defined by the central aperture and a center top of upper ball joint boss bore can be about 1.6 inches to about 4.6 inches. A distance between a central longitudinal axis defined by the central aperture and a center top of lower ball joint boss bore can be about 3.05 inches to about 6.05 inches. Also, a distance between a central longitudinal axis defined by the central aperture and a center top of lower ball joint boss bore is about 2.1 inches to about 5.1 inches.

In a second aspect, the present invention provides a method of lowering the chassis frame of an automobile, where the method comprising coupling an upper A-frame and a lower A-frame of the automobile with a steering knuckle that includes an upper ball joint boss, a lower ball joint boss, a central aperture that receives a live wheel hub assembly, and a tap opening. The steering knuckle can include a central longitudinal axis defined by the tap opening, where the axis intersects the upper ball joint boss. An underside of the steering knuckle lower ball joint boss can include a countersunk opening. A distance between a central longitudinal axis defined by the central aperture and a center top of upper ball joint boss bore can be about 1.6 inches to about 4.6 inches. A distance between a central longitudinal axis defined by the central aperture and a center top of lower ball joint boss bore can be about 3.05 inches to about 6.05 inches. Also, a distance between a central longitudinal axis defined by the central aperture and a center top of lower ball joint boss bore is about 2.1 inches to about 5.1 inches.

In a third aspect, the present invention provides a system of lowering the chassis frame of an automobile, where the system includes a steering knuckle that has an upper ball joint boss coupled with an upper control arm of the automobile, a lower ball joint boss coupled with a lower control arm of the automobile via a lower ball joint housing, a central aperture that receives a live wheel hub assembly, and a tap opening. The system also includes a spacer at least partially disposed inside the lower A-frame. The steering knuckle can include a central longitudinal axis defined by the tap opening, where the axis intersects the upper ball joint boss. An underside of the steering knuckle lower ball joint boss can include a countersunk opening. A distance between a central longitudinal axis defined by the central aperture and a center top of upper ball joint boss bore can be about 1.6 inches to about 4.6 inches. A distance between a central longitudinal axis defined by the central aperture and a center top of lower ball joint boss bore can be about 3.05 inches to about 6.05 inches. Also, a distance between a central longitudinal axis defined by the central aperture and a center top of lower ball joint boss bore is about 2.1 inches to about 5.1 inches.

DETAILED DESCRIPTION OF THE INVENTION

The present invention is particularly useful for lowering the front end of an automobile. The devices and methods of the present invention will find use in any variety of automobiles, such as trucks, sport utility vehicles (SUVs), passenger cars, and the like.

Figure 1A:
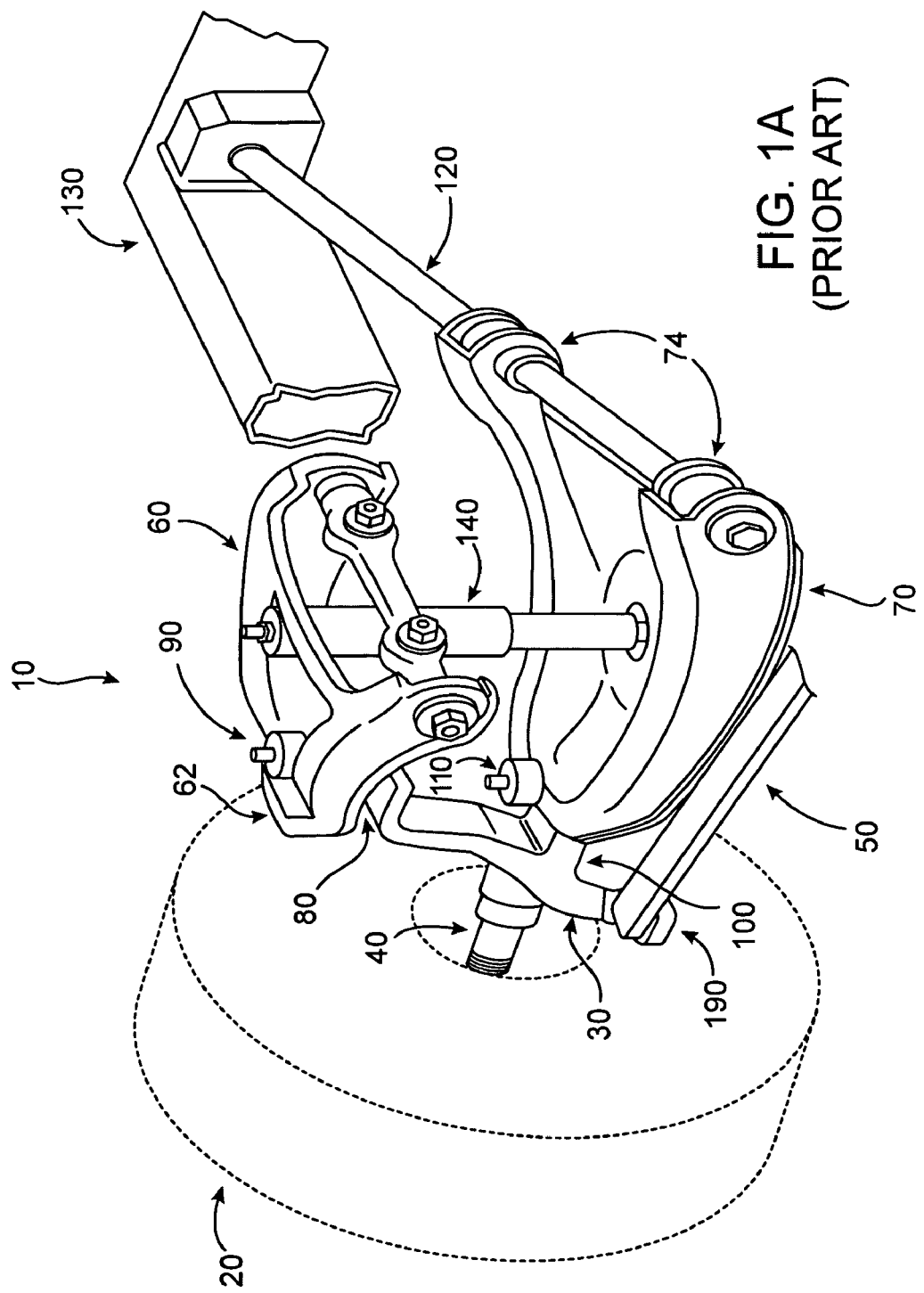
FIG. 1A is a perspective view of a torsion bar suspension system of a vehicle.

Turning now to the drawings, FIG. 1A illustrates a front suspension 10 of an automobile. This particular style is known as a torsion bar type of suspension. Torsion bar suspensions are commonly found on sport utility vehicles such as the Chevrolet Tahoe, Chevrolet Suburban, GMC Yukon, and GMC Suburban GXL. A front wheel 20 is rotatably mounted on a steering knuckle 30 via a spindle pin 40. Steering knuckle 30 is sometimes referred to as a pivot joint or a steering swivel. Knuckle 30 allows the wheel to pivot, and helps to absorb the forces and moments that act upon the wheel. Knuckle 30 is pivotally coupled with a tie rod 50, an upper A-frame 60, and a lower A-frame 70. Tie rod 50 transmits turning forces to steering knuckle 30. A frames 60 and 70 are also referred to as A arms or control arms. An upper A-frame peak 62 is coupled with an upper ball joint boss 80 of knuckle 30 via an upper ball joint 90. Likewise, lower A-frame peak 72 is coupled with a lower ball joint boss 100 of knuckle 30 via a lower ball joint 110. Ball joints 90, 110 have a ball and socket type of construction, and allow steering knuckle 30 to tilt and rotate in several directions simultaneously. A front end of a torsion bar 120 is coupled with lower A-frame leg 74, and a rear end of torsion bar 120 is coupled with chassis frame 130. Torsion bar 120 helps to absorb road shock by twisting lengthwise when lower A frame 70 moves up and down. Typically, torsion bar 120 is made of heat or pressure treated steel, and returns to its original shape after being twisted. Torsion bar suspensions also include a shock absorber 140 that is coupled with A-frames 60 and 70.

Figure 1B:
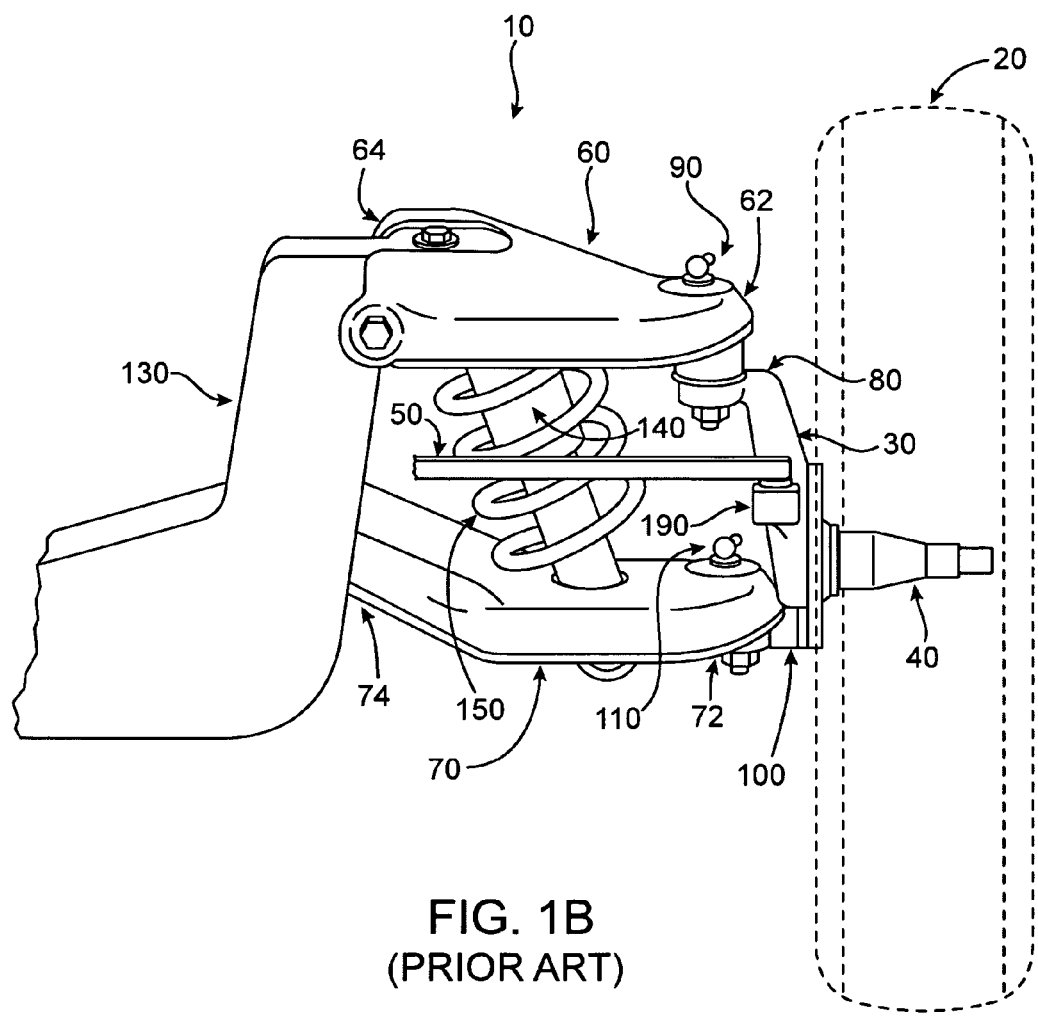
FIG. 1B is a perspective view of a coiled spring suspension system of a vehicle.

FIG. 1B shows a front suspension 10 of an automobile having a coiled spring type of suspension. Coiled spring suspensions can be found on many trucks, such as the GMC C15. In many respects, this suspension is similar to the torsion bar suspension of FIG. 1A. The coiled spring suspension, however, includes a coil spring 150 instead of a torsion bar. Upper A-frame leg 64 is coupled with frame 130. Upper A-frame peak 62 is coupled with an upper ball joint boss 80 of knuckle 30 via an upper ball joint 90. Similarly, lower A-frame leg 74 is coupled with frame 130. Lower A-frame peak 72 is coupled with a lower ball joint boss 100 of knuckle 30 via a lower ball joint 110. This configuration allows wheel 20 to freely move up and down relative to frame 130. A-frames 60 and 70 also help to maintain the position of wheel 20.

FIGS. 1A and 1B are examples of a short-long arm (SLA) suspension. This configuration is also known as a ball joint suspension, short-arm long-arm suspension, or parallel suspension. In an SLA suspension, upper controls arms 60 and lower control arms 70 are of different length. Typically, upper arms 60 are shorter than lower arms 70.

Figure 2:
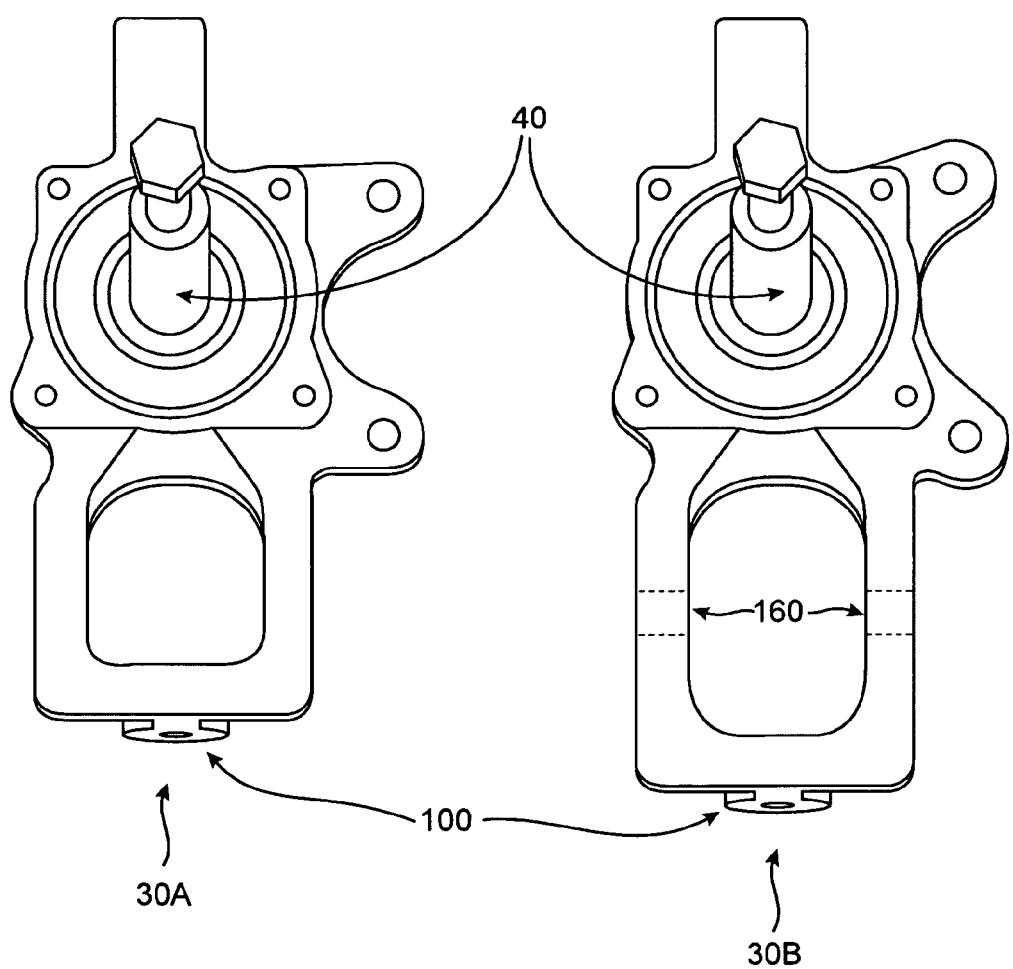
FIG. 2 is a side view of a dead axle steering knuckle and a dead axle drop spindle.

FIG. 2 shows a dead axle steering knuckle 30A and a dead axle drop spindle 30B. In drop spindle 30B (prior art), extension section 160 has been added to increase the distance between spindle pin 40 and lower ball joint boss 100. As a result, frame chassis 130 of the automobile can be lowered relative to wheel 20.

Figure 3A:
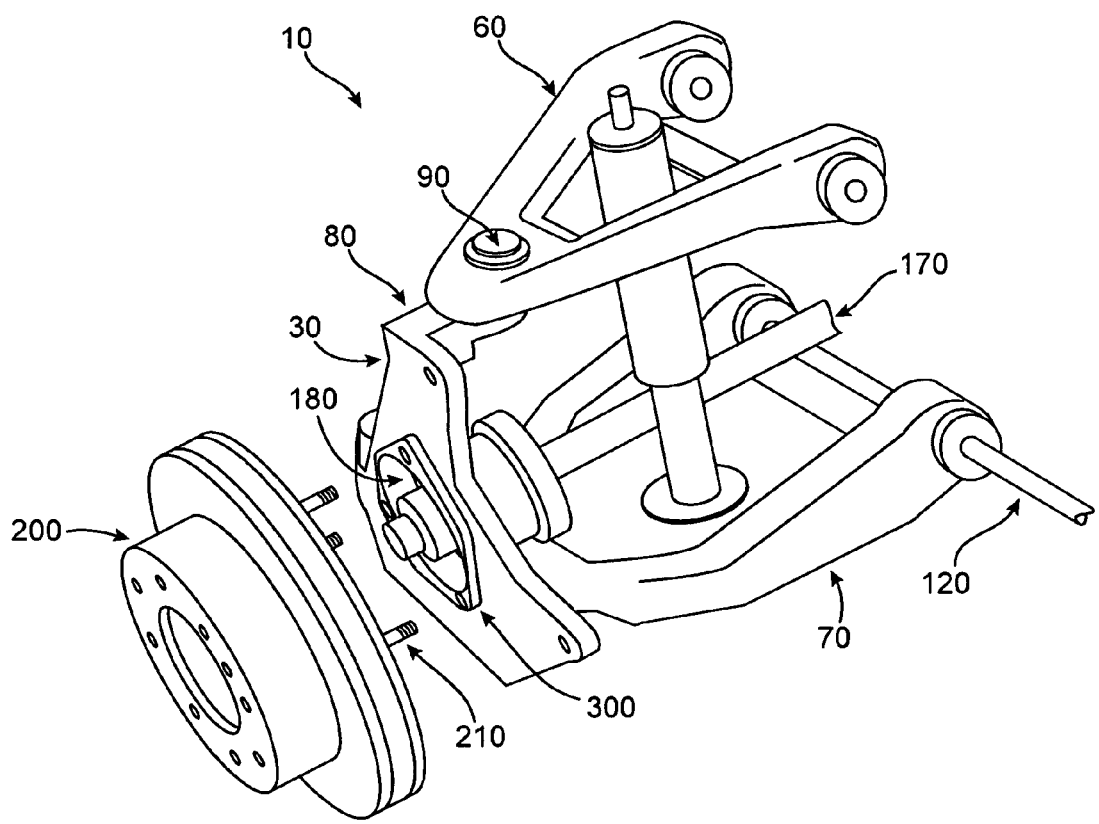
FIG. 3A is a perspective view of a torsion bar suspension system with a live axle.

FIG. 3A illustrates a front suspension 10 from a front wheel drive (FWD) or four wheel drive (4WD) vehicle. Front suspension 10 includes a drive axle 170 that transfers driving power to wheel 20. Whereas a dead axle steering knuckle allows wheel 20 to passively rotate about spindle pin 40, many FWD and 4WD vehicles require a steering knuckle 30 that can accommodate drive axle 170. This is typically accomplished by including a knuckle aperture 180 in knuckle 30, through which drive axle 170 passes. Hub 200 is coupled with knuckle 30 by hub bolts 210 that pass through hub bolt openings 300.

Figure 3B:
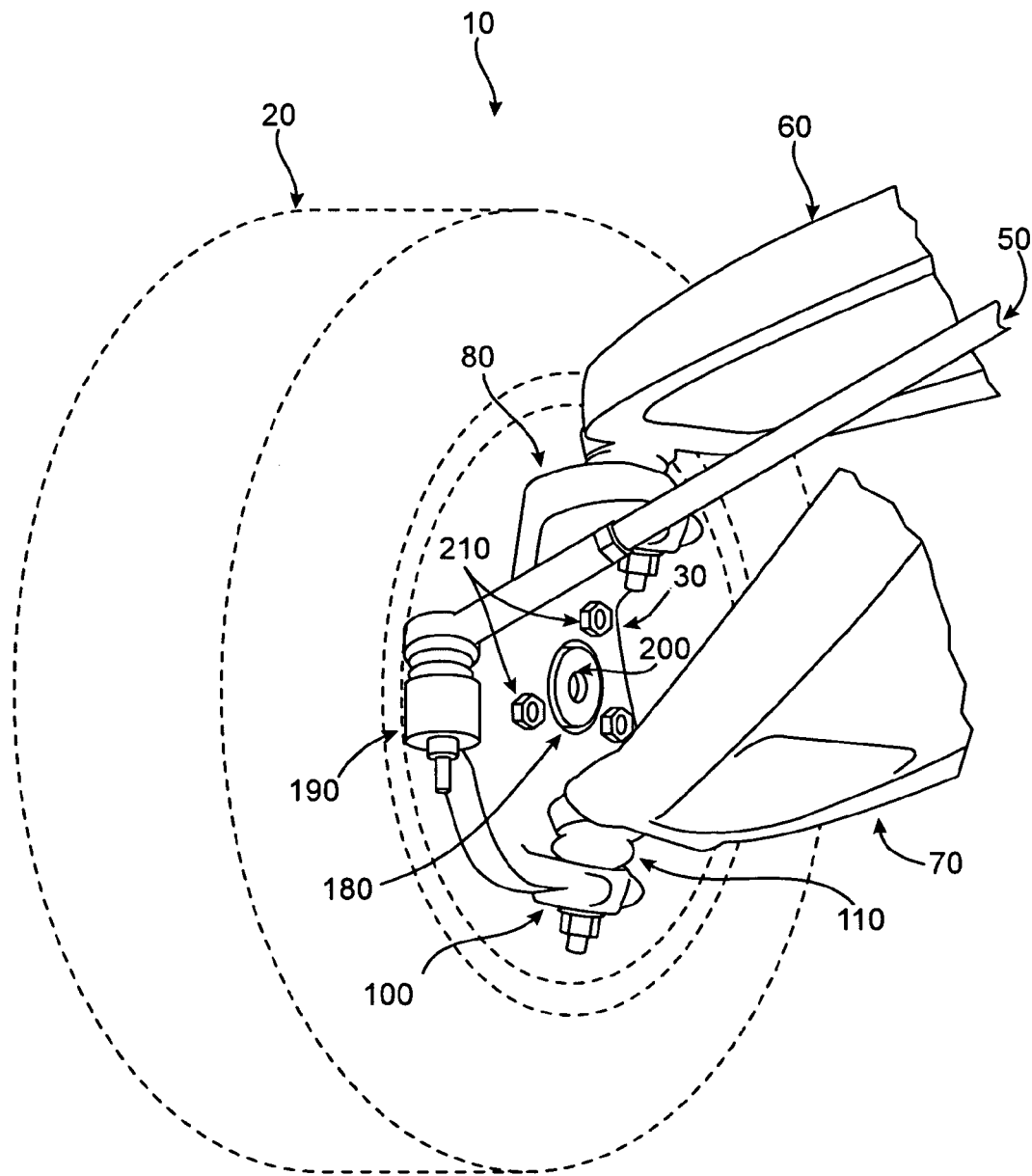
FIG. 3B is a perspective view of a torsion bar suspension system a live axle steering knuckle, but without a live axle.

FIG. 3B shows a perspective view of a stock front suspension 10 from a rear wheel drive (RWD) vehicle having torsion bar type front suspension. Steering knuckle 30 includes a steering arm 190, upper ball joint boss 80, lower ball joint boss 100, and knuckle aperture 180. Steering arm 190 connects knuckle 30 with tie rod 50. Upper ball joint boss 80 and lower ball joint boss 100 connect knuckle 30 with upper ball joint 90 and lower ball joint 110, respectively. Traditionally, rear wheel drive vehicles were manufactured with the dead axle type of steering knuckle. To reduce costs, however, some two rear drive vehicles are now manufactured with a front steering knuckle that has a central aperture, like the steering knuckles used in front wheel drive and four wheel drive vehicles. In these newer rear wheel drive vehicles, the front wheel is coupled with a hub assembly 200, instead of rotating about a traditional spindle pin steering knuckle. Although these vehicles do not include a front drive axle, they still have a steering knuckle with a central aperture to accommodate the live wheel hub assembly. Accordingly, as shown in FIG. 3B, live axle 170 is no longer included. Hub assembly 200 is coupled with wheel 20 and knuckle 30 via hub assembly bolts 210.

Figure 4A:
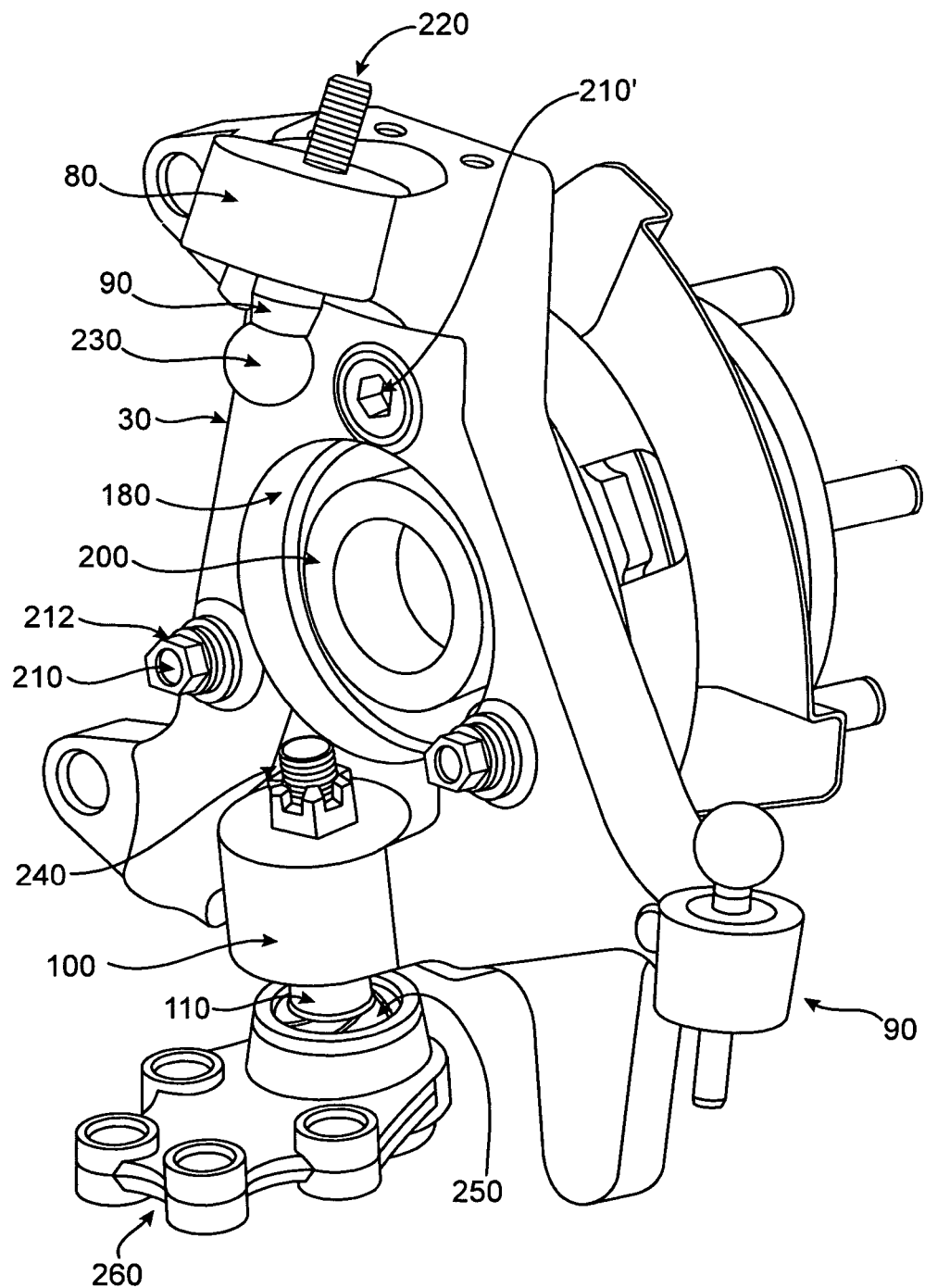
FIG. 4A is a perspective view of a torsion bar suspension system with a drop spindle as in the prior art.
Figure 4B:
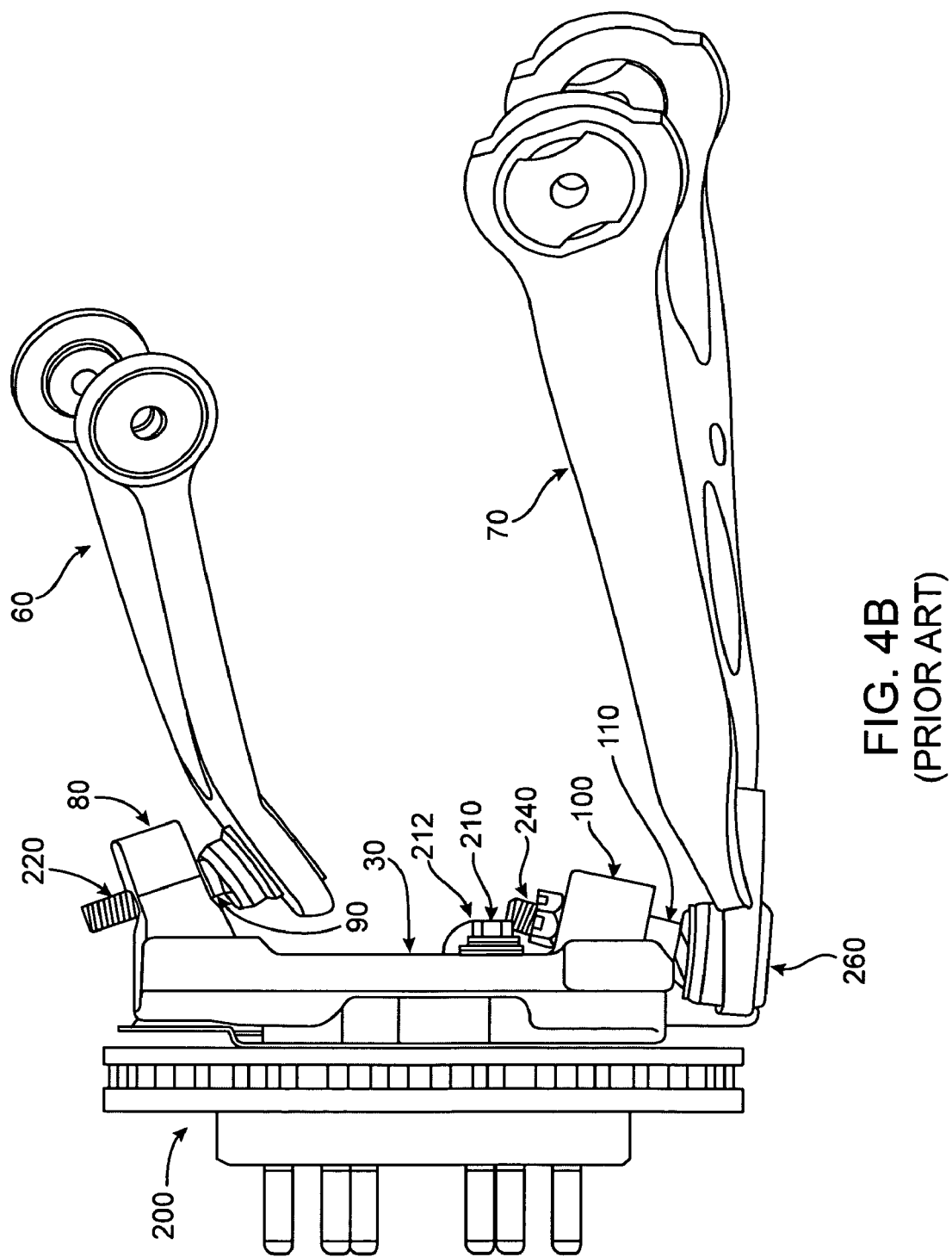
FIG. 4B is a front view of a torsion bar suspension system with a drop spindle as in the prior art.

Previous drop spindles for live axle steering knuckles require significant modifications to the steering knuckle itself, as well as to other components of the front suspension. As shown in FIGS. 4A and 4B (prior art), upper ball joint 90 is changed to an inverted position, so that the originally downward oriented upper ball joint stud 220 becomes upward oriented. Consequently, the ball 230 of upper ball joint 90 is now disposed below ball joint boss 80, instead of above it. Further, the angle of upper ball joint boss 80 of knuckle 30 is inverted to allow use with inverted upper control arm 60. Likewise, lower ball joint 110 is changed to an inverted position, so that the originally downward oriented lower ball joint stud 240 becomes upward oriented. Further, this assembly requires a modified lower ball joint housing 260 specially designed to bear a load while in a inverted position. Because ball joint balls 230, 250 are disposed below ball joint bosses 80, 100, instead of above them, pulling tension is created between upper ball joint 90 and upper A-frame 60, and between lower ball joint 110 and lower ball joint housing 260. This approach also requires that A-frames 60, 70 be inverted from their originally intended orientation. This design requires strained suspension geometries. In an optimal set up, ball joints 90 and 110 in alignment with one another. In this proposed knuckle, however, ball joints 90 and 110 are not in alignment, and thus are forced to twist and pivot against one another. What is more, instead of a hub assembly bolt 210 and nut 212 at the top, this drop spindle includes a top countersunk hub assembly bolt 210' with a hex depression. The smaller hex size is more prone to stripping when subjected to the torque forces required to tighten bolt 210'. Installation of drop spindles such as the type shown in FIGS. 4A and 4B also result in a reduced amount of travel in the vehicle. In other words, the exaggerated lowering of the control arms makes it difficult to retain the original amount of suspension travel.

As described below in the following figures, the present invention provides a tap opening 4270 that allows upper ball joint boss 490 to be positioned closely to central aperture 4180. The present invention also provides a countersunk opening 4104 that allows lower ball joint boss 4100 to be positioned closely to wheel rim 422.

Figure 5:
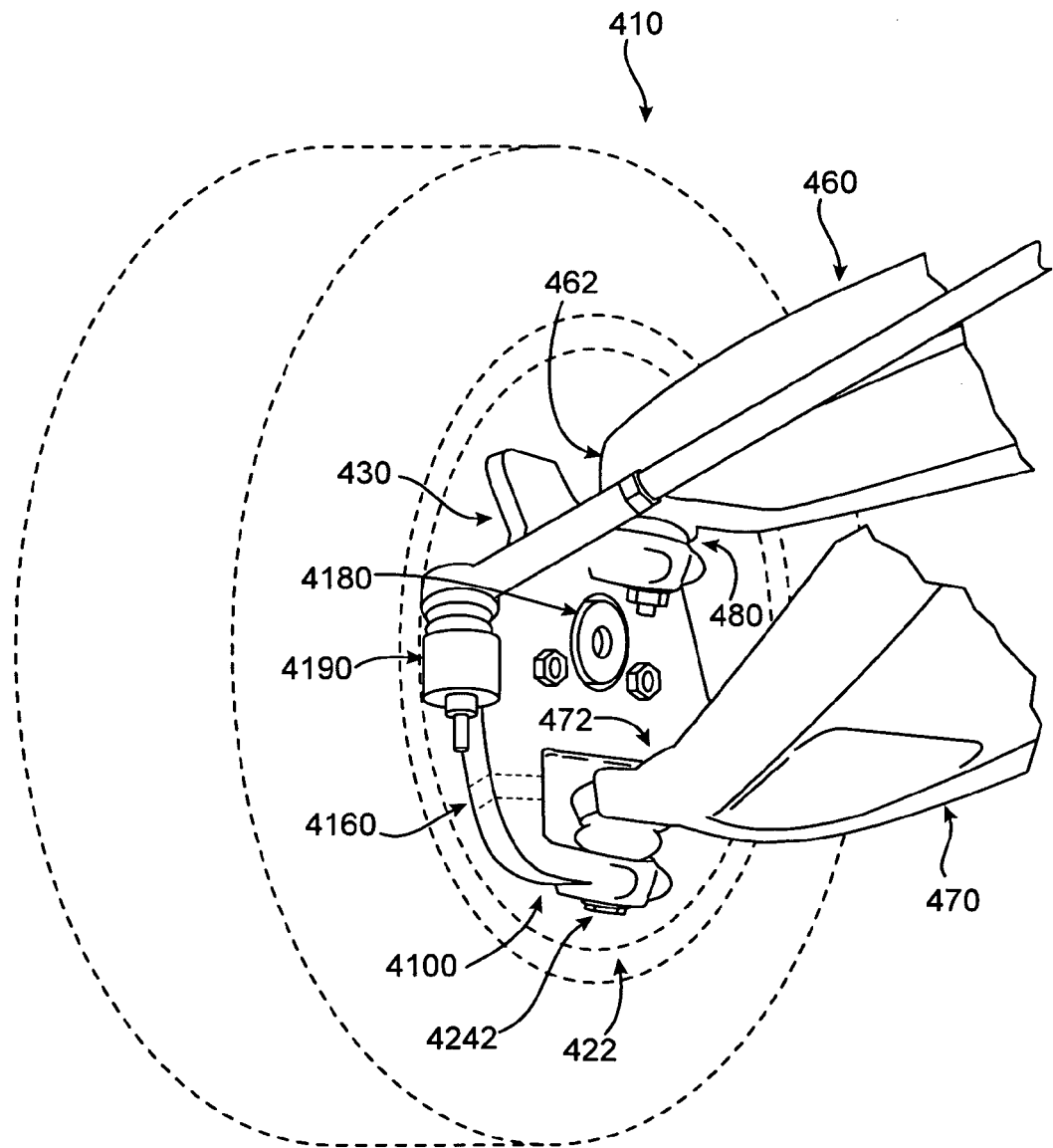
FIG. 5 is a perspective view of a torsion bar suspension system with a drop spindle according to the present invention.

FIG. 5 illustrates a perspective view of a torsion bar front suspension 410 from a rear wheel drive vehicle. This figure shows the present invention steering knuckle 430, or drop spindle, that lowers the front end of the automobile. In comparison with the stock knuckle shown in FIG. 3B, drop spindle 430 includes a tap opening 4270 (not shown here) instead of a top hub assembly bolt aperture 300 (not shown here). Because upper ball joint boss 480 can be located closer to central knuckle aperture 4180, upper A-frame peak 462 can be located closer to aperture 4180, and thus more closely to the ground. What is more, drop spindle 430 can also include an extension section 4160 that positions lower ball joint boss 4100 further from knuckle aperture 4180. Thus, lower A-frame peak 472 can be located further from aperture 4180, and closer to the ground. Lower ball joint boss 4100 also includes a countersunk opening 4104 (not shown here) that contains a bolt head 4242 of lower ball joint stud 4240 (not shown here). Knuckle 430 can also be used with a shortened lower ball joint stud 4240. A shortened stud 4240 can be provided by cutting the stock stud, or by providing a new stud that is shorter than the original stock stud. Shortened lower ball joint stud 4240 allows lower ball joint boss 4100 to be positioned closer to the inside of a wheel rim 422. Similarly, countersunk opening 4104 also allows lower ball joint boss 4100 to be positioned closer to the inside of wheel rim 422. A shortened stud 4240 and a countersunk opening 4104 can also be combined to allow lower ball joint boss 4100 to be positioned more closely to the inside of wheel rim 422. Typically, drop spindle 430 of the present invention allows the chassis frame to be lowered from about 0.5 inches to about 3.5 inches, when compared to the stock knuckle, and can also lower the chassis frame from about 1.5 inches to about 2.5 inches. Drop spindle 430 can also lower the chassis frame about 2.0 inches. In the present invention, there is no exaggerated lowering of the control arms due to attachment beneath the ball joint bosses. Consequently, a greater amount of suspension travel can be retained. In a stock set-up, torsion bar suspensions are typically used with 16 inch wheels. The drop spindle of the present invention can be used with wheels of a variety of sizes, including wheels of 17 inches and higher.

Figure 6:
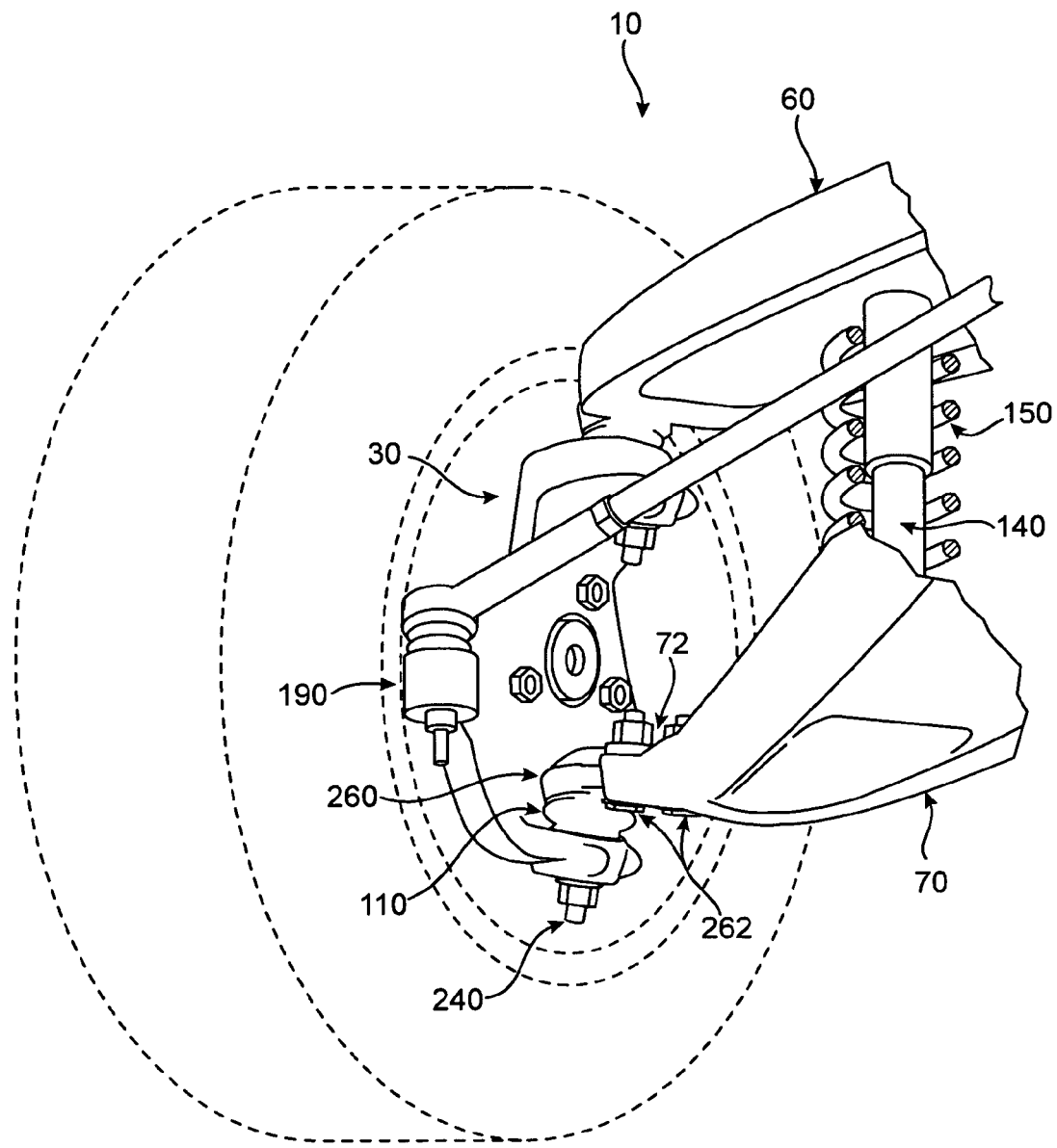
FIG. 6 is a perspective view of a coiled spring suspension system with a live axle steering knuckle, but without a live axle.

FIG. 6 shows stock knuckle 30 for coiled spring front suspension 10. This is essentially the same as the stock set-up for the torsion bar suspension system shown in FIG. 3B, except lower A-frame peak 72 does not rest directly upon lower ball joint 110, but instead is coupled with lower ball joint 110 by a lower ball joint housing 260 and lower ball joint housing bolts 262. This constellation of elements is further shown in FIG. 7B.

Figure 7A:
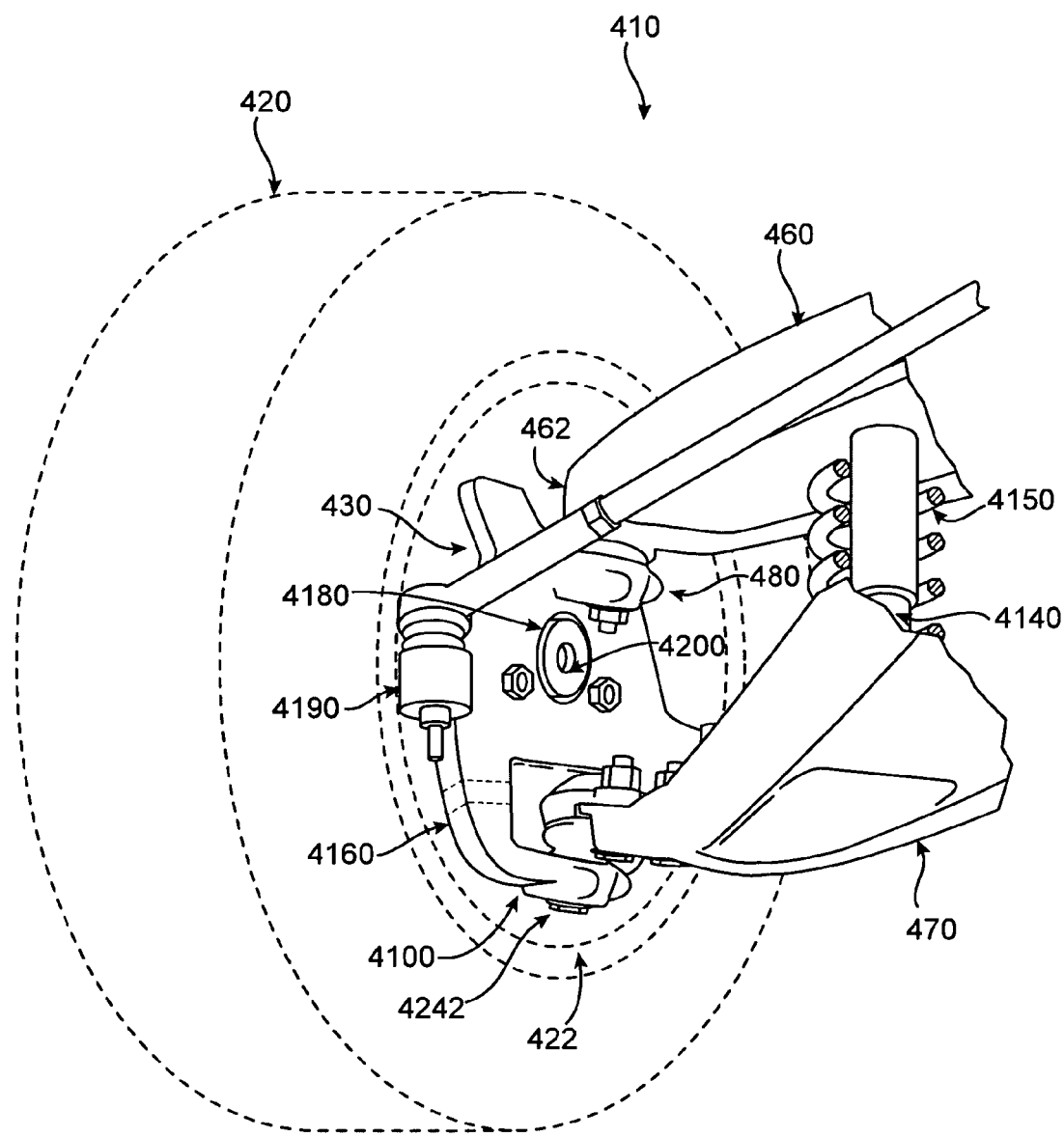
FIG. 7A is perspective view of a coiled spring suspension system with a drop spindle according to the present invention.

FIG. 7A shows present invention drop spindle 430 for a coiled spring front suspension 10. As with torsion bar drop spindle shown in FIG. 5, drop spindle 430 of FIG. 7A includes a tap opening 4270 (not shown here) instead of a top hub assembly bolt aperture 300 (not shown here). Because upper ball joint boss 480 can be located closer to central knuckle aperture 4180, upper A-frame peak 462 can be located closer to aperture 4180, and thus more closely to the ground. What is more, drop spindle 430 can also include an extension section 4160 that positions lower ball joint boss 4100 further from knuckle aperture 4180. Thus, lower A-frame peak 472 can be located further from aperture 4180, and closer to the ground. Lower ball joint boss 4100 also includes a countersunk opening 4104 (not shown here) that contains a bolt head 4242 of lower ball joint stud 4240 (not shown here). Lower ball joint stud 4240 is shortened, which, in combination with countersunk opening 4104, allows lower ball joint boss 4100 to be positioned more closely to the inside of a wheel rim 422. Typically, drop spindle 430 of the present invention allows the chassis frame to be lowered from about 0.5 inches to about 3.5 inches, when compared to the stock knuckle, and can also lower the chassis frame from about 1.5 inches to about 2.5 inches. Drop spindle 430 can also lower the chassis frame about 2.0 inches. In a stock set-up, coiled spring suspensions are typically used with 16 inch wheels. The drop spindle of the present invention can be used with wheels of a variety of sizes, including wheels of 16 inches and higher.

Drop spindle 430 for coiled spring suspension 410 can differ from the torsion bar drop spindle shown in FIG. 5, however, in that lower ball joint boss 4100 in a coiled spring set-up can be raised slightly higher than lower ball joint boss in a torsion bar set-up. For example, lower ball joint boss can be raised about 0.9 inches higher, in comparison. Consequently, drop spindle 430 can be used with trucks having stock 16 inch wheels. In a coiled spring suspension, the connection of lower A-frame peak 472 to lower ball joint tab 4100 also differs from the torsion bar suspension shown in FIG. 6. This coiled spring suspension connection is shown in greater detail in FIG. 7C.

Figure 7B:
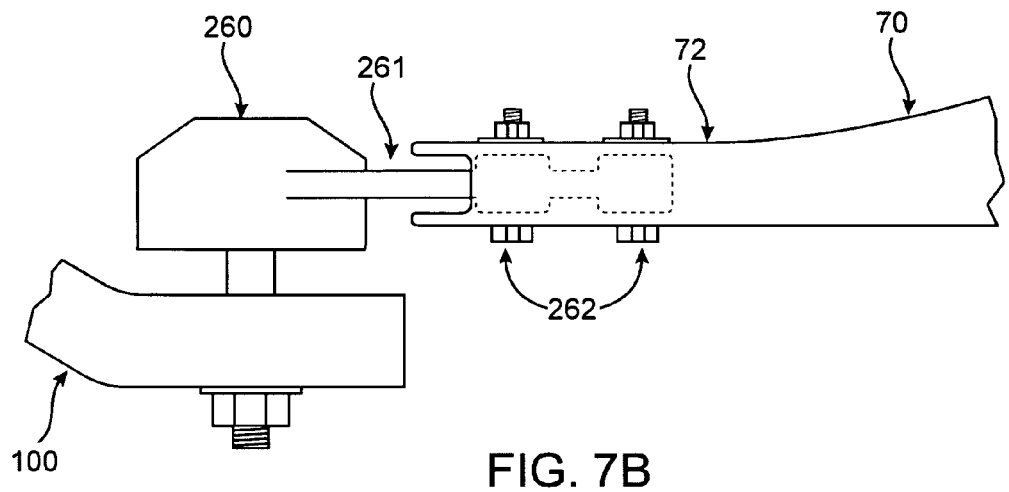
FIG. 7B is a partial side view of a coiled spring suspension system.

FIG. 7B illustrates a side view of the connection between stock knuckle lower ball joint boss 100 and lower A-frame peak 72. A housing arm 261 of lower ball joint housing 260 is disposed in the interior of lower A frame peak 72, and is coupled thereto by a plurality of lower ball joint housing bolts 262.

Figure 7C:
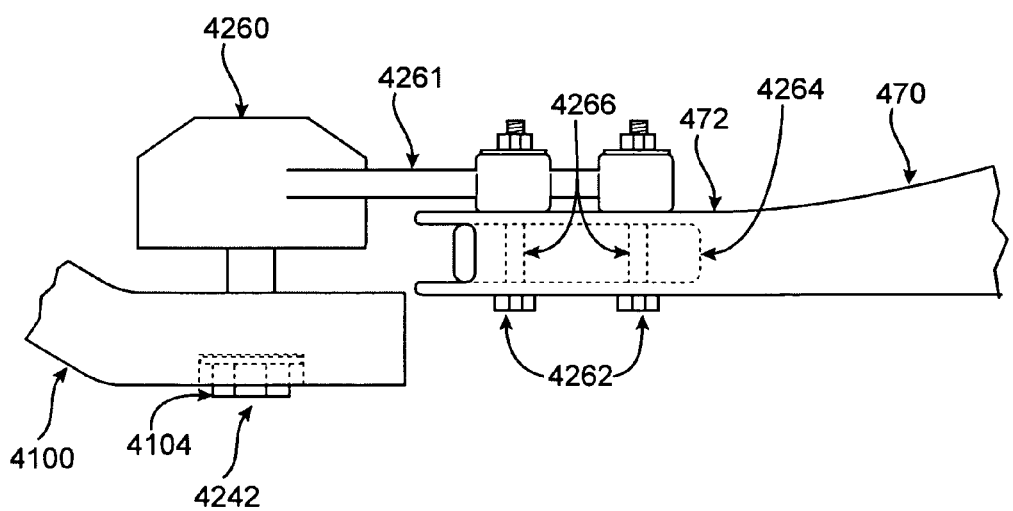
FIG. 7C is a partial side view of a coiled spring suspension system of the present invention.

FIG. 7C shows a side view of the connection between present invention drop spindle lower ball joint boss 4100 and lower A-frame peak 472. Housing arm 4261 of lower ball joint housing 4260 is disposed on top of lower A-frame peak, and spacer 4264 is disposed in the interior of lower A frame peak 472. Housing arm 4261, peak 472, and spacer 4264 are coupled together with lower ball joint housing bolts 4262, which pass through spacer apertures 4266 of spacer 4264. Spacer 4264 can provide additional structural integrity to lower control arm peak 472. Spacer 4264 typically will have dimensions similar to those of housing arm 4261. For example, spacer 4264 can have a height of about 0.75 inches, which is similar to the height of housing arm 4261.

Figure 8:
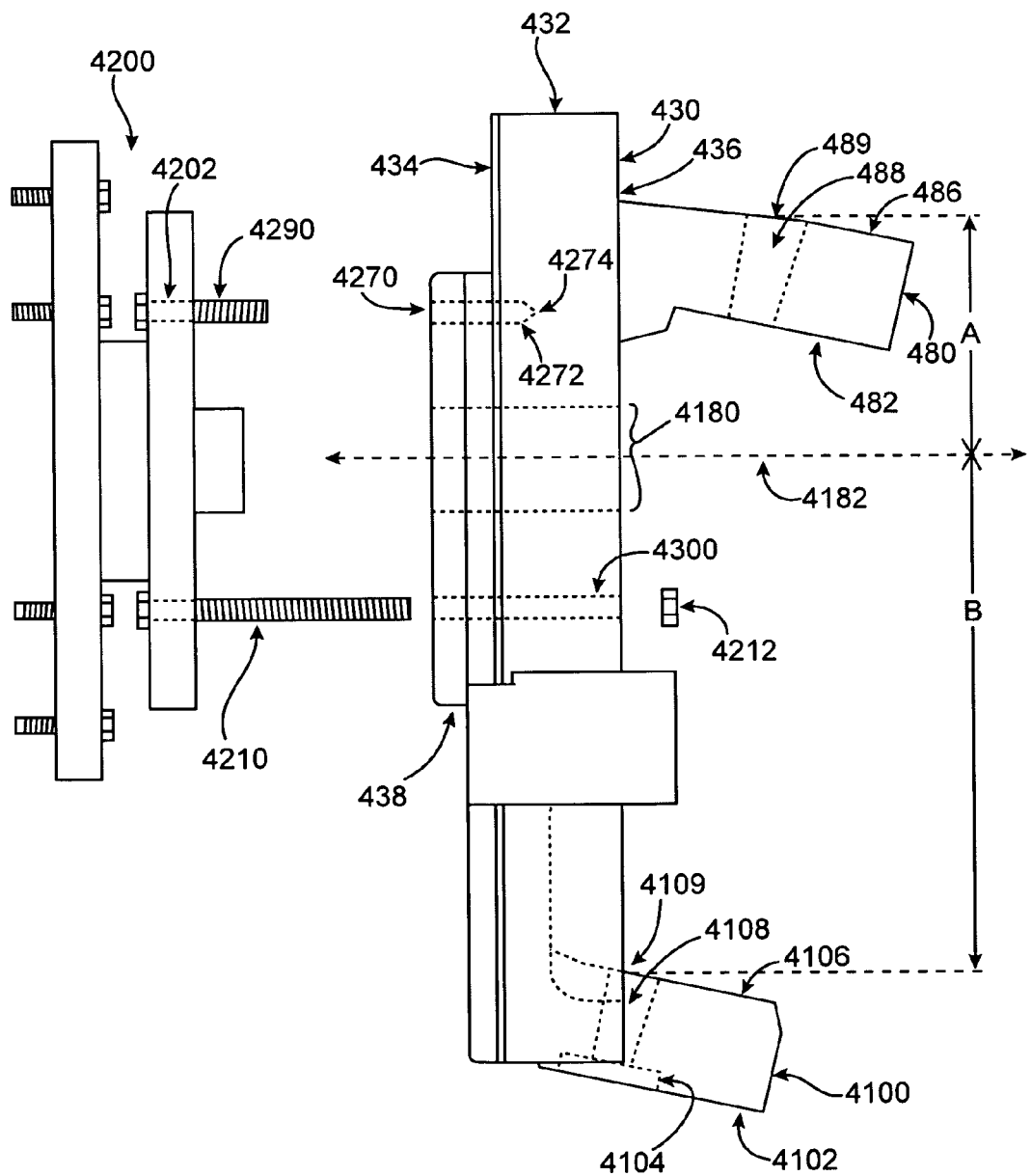
FIG. 8 is a front view of a drop spindle according to the present invention.

FIG. 8 shows a cross sectional front view of knuckle 430 of present invention and hub assembly 4200. A tap opening 4270 extends through a raised hub mounting flange 438 and into a body 432 of knuckle 430. Below the center of aperture 4180, knuckle 430 is coupled with wheel hub assembly 4200 by hub assembly bolts 4210 that pass through bolt openings 4300. Above aperture 4180, knuckle 430 is coupled with wheel hub assembly 4200 by hub assembly stud 4290 and tap opening 4270. This coupling can be effected in a variety of ways, including various bolt or stud combinations, so long as it does not prevent or obstruct the desired positioning of upper ball joint boss 480. The position of tap opening 4270 allows upper ball joint boss 480 to be located approximately horizontal to upper aperture 4202 of wheel hub assembly 4200. An underside 4102 of lower ball joint boss 4100 includes a countersunk opening 4104 that is configured to receive a bolt head 4242 of lower ball joint stud 4240, as shown in FIG. 7C. Upper ball joint boss 480 includes an upper ball joint boss bore 488 to accommodate upper ball joint stud 4220. Likewise, lower ball joint boss 4100 includes a lower ball joint boss bore 4108 to accommodate lower ball joint stud 4240.

The distance between an underside 482 of upper ball joint boss 480 and a topside 4106 of lower ball joint boss 4100 typically ranges from about 5 inches to about 11 inches, and can also range from about 7 inches to about 9 inches. The distance between an underside 482 of upper ball joint boss 480 and a topside 4106 of lower ball joint boss 4100 can also be about 8.001 inches. The thickness of knuckle body 432 corresponds to the distance between a knuckle exterior 434 and a knuckle interior 436. The thickness of knuckle body 432 typically ranges from about 0.440 inches to about 2.440 inches, and can also range from about 0.940 inches to about 1.940 inches. The thickness of knuckle body 432 can also be about 1.440 inches. The height of upper ball joint boss 480 corresponds to the distance between the topside 486 and underside 482 of upper ball joint boss 480. Likewise, the height of lower ball joint boss 4100 corresponds to the distance between the topside 4106 and underside 4102 of lower ball joint boss 4100. The height of upper ball joint boss 480 and lower ball joint boss 4100 typically ranges from about 0.350 inches to about 2.350 inches, and can also range from about 0.850 inches to about 1.850 inches. The height of upper ball joint boss 480 and lower ball joint boss 4100 can also be about 1.350 inches. It is not necessary, however, that the height of upper ball joint boss 480 be equal to the height of lower ball joint boss 4100.

The depth of tap opening 4270 extending to the end of threaded section 4272 typically ranges from about 0.25 inches to about 1.25 inches, and can also range from about 0.50 inches to about 1.00 inch. The depth of tap opening 4270 extending to the end of threaded section 4272 can also be about 0.75 inches. The depth of tap opening 4270 extending to the end of bored section 4274 typically ranges from about 0.325 inches to about 1.925 inches, and can also range from about 0.625 inches to about 1.625 inch. The depth of tap opening 4270 extending to the end of bored section 4274 can also be about 1.125 inches. Often, if a certain length of threaded section is needed or desired, the total bore depth will be approximately 0.375 inches deeper.

The depth of countersunk opening 4104 typically ranges from about 0.050 inches to about 0.450 inches, and can also range from about 0.150 inches to about 0.350 inches. The depth of countersunk opening 4104 can also be about 0.196 inches or about 0.250 inches. The taper of lower ball joint boss bore 4108 typically ranges from about 1 inch to about 3 inches per foot, and can also range from about 1.5 inches to about 2.5 inches per foot. The taper of lower ball joint boss bore 4108 can also be about 2.0 inches per foot. In many trucks, this bore taper is either 1.5 inches or 2 inches per foot. The diameter of lower ball joint boss bore 4108 at topside of boss 4106 typically ranges from about 0.375 inches to about 1.375 inches, and can also be about 0.75 inches to about 1.0 inches. The diameter of lower ball joint boss bore 4108 at topside of boss 4106 can also be about 0.875 inches. The diameter of upper ball joint boss bore 488 at topside of boss 486 typically ranges from about 0.25 inches to about 1.05 inches, and can also be about 0.50 inches to about 0.80 inches. The diameter of upper ball joint boss bore 488 at topside of boss 486 can also be about 0.65 inches. The taper of upper ball joint boss bore 488 can have dimensions similar to those mentioned for lower ball joint boss bore 4108.

The distance A between a central longitudinal axis 4182 defined by central aperture 4180 and a center top 489 of upper ball joint boss bore 488 typically ranges from about 1.6 inches to about 4.6 inches, and can also range from about 2.6 inches to about 3.6 inches. The distance A between a central longitudinal axis 4182 defined by central aperture 4180 and a center top 489 of upper ball joint boss bore 488 can also be about 3.1 inches. In a torsion bar suspension system, the distance B between a central longitudinal axis 4182 defined by central aperture 4180 and a center top 4109 of lower ball joint boss bore 4108 typically ranges from about 3.05 inches to about 6.05 inches, and can also range from about 4.05 inches to about 5.05 inches. The distance B between a central longitudinal axis 4182 defined by central aperture 4180 and a center top 4109 of lower ball joint boss bore 4108 can also be about 4.55 inches. In a coiled spring suspension system, the distance B between a central longitudinal axis 4182 defined by central aperture 4180 and a center top 4109 of lower ball joint boss bore 4108 typically ranges from about 2.1 inches to about 5.1 inches, and can also range from about 3.1 inches to about 4.1 inches. The distance B between a central longitudinal axis 4182 defined by central aperture 4180 and a center top 4109 of lower ball joint boss bore 4108 can also be about 3.6 inches.

Figure 9A:
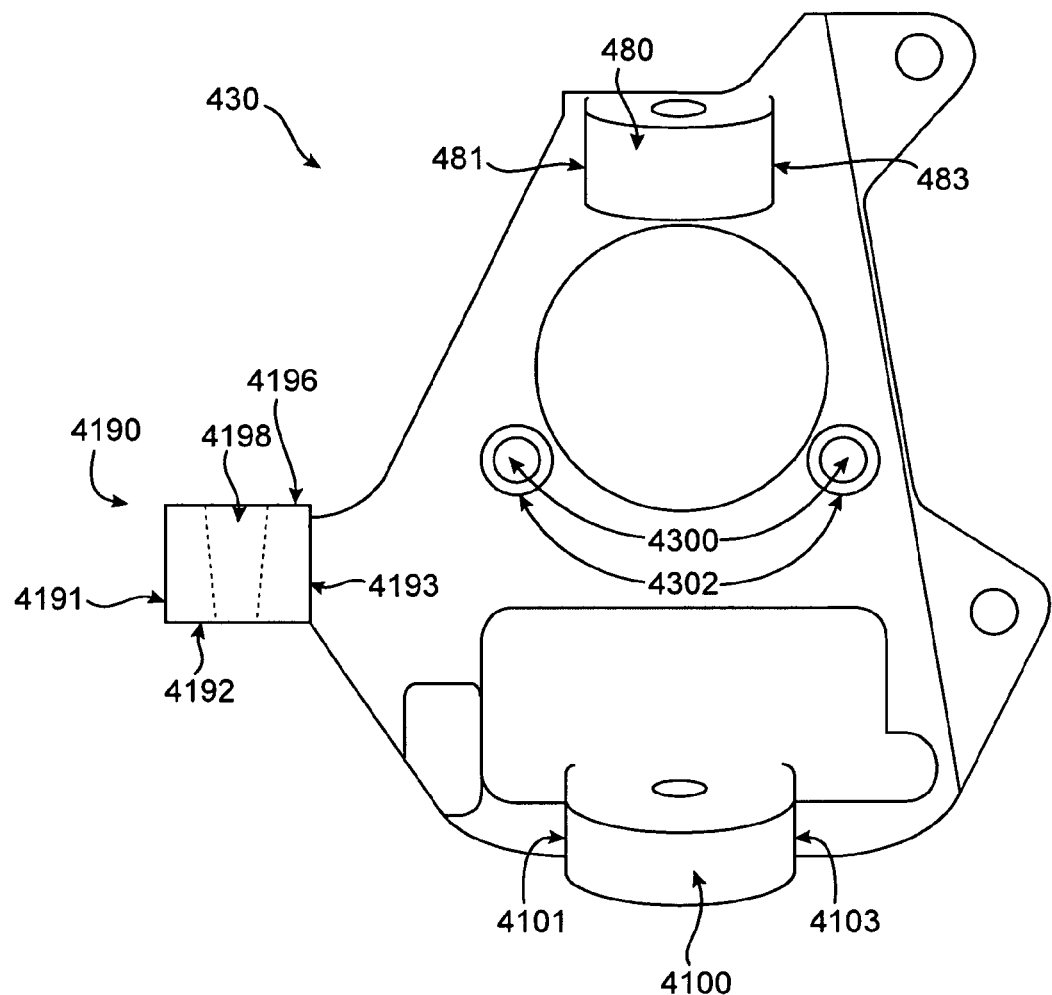
FIG. 9A is a side view of a drop spindle according to the present invention.

FIG. 9A illustrates an interior side view of passenger side steering knuckle 430 of the present invention. Steering knuckle 430 includes upper ball joint boss 480, lower ball joint boss 4100, knuckle aperture 4180, hub assembly bolt apertures 4300, steering arm 4190, tap opening 4270, and bungs 4302. A thickness of upper ball joint boss 480 corresponds to the distance between a front 481 and a back 483 of upper ball joint boss 480. The thickness of upper ball joint boss 480 typically ranges from about 1.5 inches to about 3.5 inches, and can also range from about 2.0 inches to about 3.0 inches. The thickness of upper ball joint boss 480 can also be about 2.5 inches. A thickness of lower ball joint boss 4100 corresponds to the distance between a front 4101 and a back 4103 of lower ball joint boss 4100. The thickness of lower ball joint boss 4100 typically ranges from about 2.0 inches to about 4.0 inches, and can also range from about 2.5 inches to about 3.5 inches. The thickness of lower ball joint boss 4100 can also be about 3.0 inches. Hub assembly bolt apertures extend through knuckle 430. The diameter of hub assembly bolt apertures 4300 typically ranges from about 0.270 inches to about 0.870 inches, and can also range from about 0.470 inches to about 0.670 inches. The diameter of hub assembly bolt apertures 4300 can also be about 0.570 inches. The diameter of bungs 4302 typically ranges from about 0.446 inches to about 1.446 inches, and can also range from about 0.696 inches to about 1.196 inches. The diameter of bungs 4302 can also be about 0.946 inches. Bungs 4302 are often slightly raised, and can be finished or machined to a smooth surface. This allows hub assembly nuts 4212 to set flush against knuckle 430, thus facilitating an adequate tightening of nuts 4212 about bolts 4210.

The diameter of tap opening 4270 typically ranges from about 0.122 inches to about 0.722 inches, and can also range from about 0.322 inches to about 0.522 inches. The diameter of tap opening 4270 can also be about 0.422 inches. The distance between a topside 4196 of steering arm 4190 and a horizontal plane that includes the center of aperture 4180 typically ranges from about 0.886 inches to about 2.886 inches, and can also range from about 1.386 inches to about 2.386 inches. The distance between a topside 4196 of steering arm 4190 and a horizontal plane that includes the center of aperture 4180 can also be about 1.886 inches. The distance between a vertical axis that includes the center of steering arm bore 4198 and a vertical axis that includes the center of aperture 4180 typically ranges from about 4.8 inches to about 6.8 inches, and can also range from about 5.3 inches to about 6.3 inches. The distance between a vertical axis that includes the center of steering arm bore 4198 and a vertical axis that includes the center of aperture 4180 can also be about 5.8 inches.

Figure 9B:
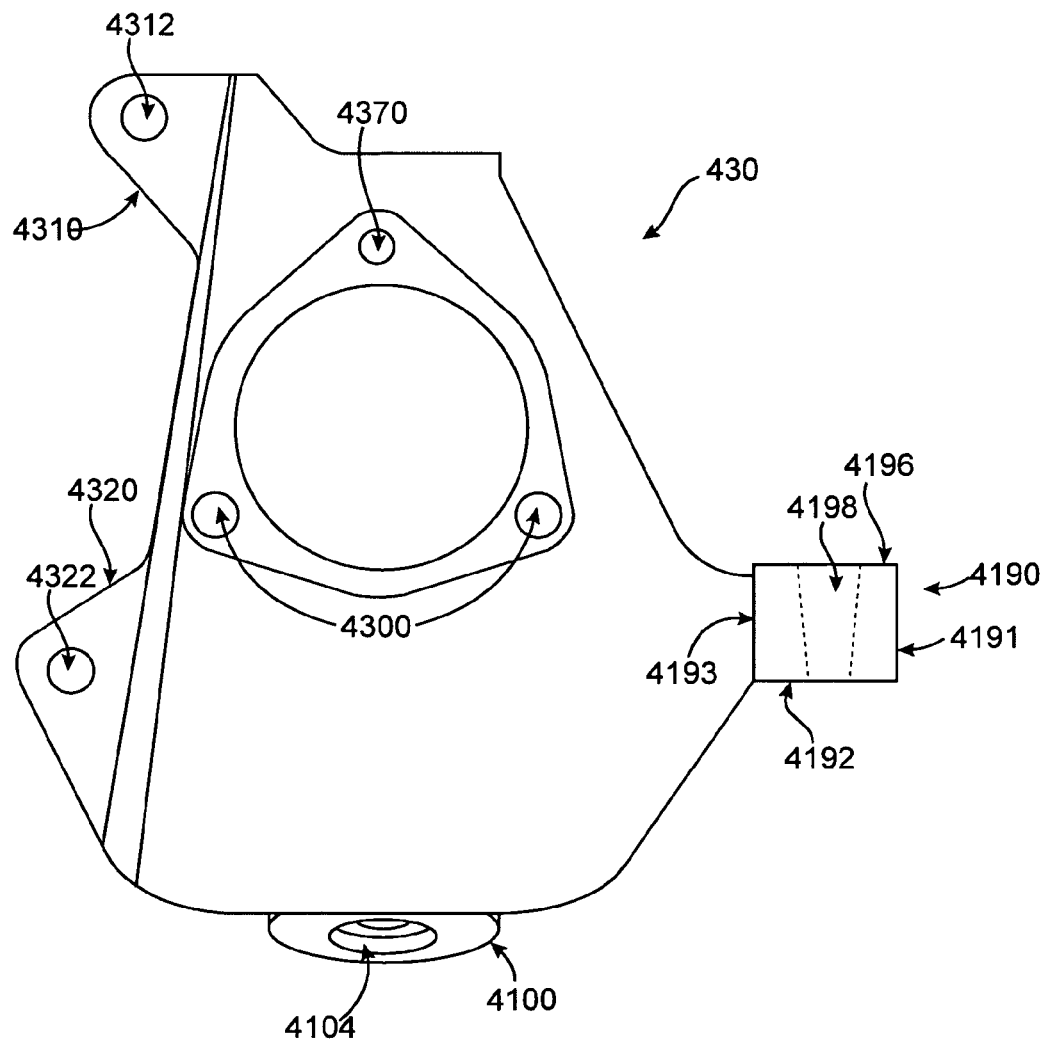
FIG. 9B is a side view of a drop spindle according to the present invention.

FIG. 9B shows an exterior side view of passenger side steering knuckle 430 of the present invention. Steering knuckle 430 includes knuckle aperture 4180, hub assembly bolt apertures 4300, steering arm 4190, and tap opening 4270, upper brake caliper tab 4310, and lower brake caliper tab 4320. The radius of knuckle aperture 4180 typically ranges from about 1.453 inches to about 2.453 inches, and can also range from about 1.703 inches to about 2.203 inches. The radius of knuckle aperture 4180 can also be about 1.953 inches. The distance between a horizontal axis that includes the center of tap opening 4270 and a horizontal axis that includes the center of aperture 4180 typically ranges from about 1.46 inches to about 3.46 inches, and can also range from about 1.96 inches to about 2.96 inches. The distance between a horizontal axis that includes the center of tap opening 4270 and a horizontal axis that includes the center of aperture 4180 can also be about 2.46 inches.

A thickness of steering arm 4190 corresponds to the distance between a front 191 and a back 193 of steering arm 4190. The thickness of steering arm 4190 typically ranges from about 0.7 inches to about 2.7 inches, and can also range from about 1.2 inches to about 2.2 inches. The thickness of steering arm 4190 can also be about 1.7 inches. A height of steering arm 4190 corresponds to the distance between a topside 4196 and an underside 4192 of steering arm 4190. The height of steering arm 4190 typically ranges from about 0.595 inches to about 2.595 inches, and can also range from about 1.095 inches to about 2.095 inches. The height of steering arm 4190 can also be about 1.595 inches. A distance between an upper caliper tab aperture 4312 of upper brake caliper tab 4310 and a lower caliper tab aperture 4322 of lower brake caliper tab 4320 typically ranges from about 5.508 inches to about 9.508 inches, and can also range from about 6.508 inches to about 8.508 inches. The distance between an upper caliper tab aperture 4312 of upper brake caliper tab 4310 and a lower caliper tab aperture 4322 of lower brake caliper tab 4320 can also be about 7.508 inches. A distance between the center of aperture 4180 and the center of upper caliper tab aperture 4312 typically ranges from about 3.26 inches to about 7.26 inches, and can also range from about 4.26 inches to about 6.26 inches. The distance between the center of aperture 4180 and the center of upper caliper tab aperture 4312 can also be about 5.26 inches. These values also apply to a distance between the center of aperture 4180 and the center of lower caliper tab aperture 4322.

While the above provides a full and complete disclosure of the preferred embodiments of the present invention, various modifications, alternate constructions and equivalents may be employed as desired. Therefore, the above description and illustrations should not be construed as limiting the invention, which is defined by the appended claims.

What is claimed is:

1. A method of lowering the chassis frame of a vehicle, the method comprising:

coupling an upper A-frame of the vehicle with an upper ball joint boss, the upper ball joint boss extending from a steering knuckle body;

coupling a lower A-frame of the vehicle with a lower ball joint boss, the lower ball joint boss extending from the steering knuckle body;

receiving a wheel hub assembly of the vehicle into an aperture of the steering knuckle body between the upper ball joint boss and the lower ball joint boss; and attaching the steering knuckle body with an upper aperture of the wheel hub assembly via a bolt or stud means, such that when the steering knuckle body is attached with the wheel hub assembly, a central longitudinal axis defined by the bolt or stud means intersects with the upper ball joint boss and is collinear with a central longitudinal axis defined by the upper aperture of the wheel hub assembly.

* * * * *